United States Patent
Maetani et al.

(10) Patent No.: US 7,483,045 B2
(45) Date of Patent: Jan. 27, 2009

(54) PRINTING APPARATUS

(75) Inventors: Motoyoshi Maetani, Iwade (JP); Naoki Kamikawa, Iwade (JP)

(73) Assignee: Noritsu Koki Co., Ltd., Wakayama-Shi, Wakayama (JP)

( * ) Notice: Subject to any disclaimer, the term of this patent is extended or adjusted under 35 U.S.C. 154(b) by 291 days.

(21) Appl. No.: 11/402,205

(22) Filed: Apr. 11, 2006

(65) Prior Publication Data

US 2006/0232618 A1 Oct. 19, 2006

(30) Foreign Application Priority Data

Apr. 18, 2005 (JP) .............................. 2005-119639

(51) Int. Cl.
*B41J 2/42* (2006.01)
*B41J 2/385* (2006.01)
*B41J 2/47* (2006.01)
*B41J 2/435* (2006.01)
*G03G 15/01* (2006.01)

(52) U.S. Cl. ...................... 347/154; 347/116; 347/130; 347/234; 347/248; 399/301

(58) Field of Classification Search .................. None
See application file for complete search history.

(56) References Cited

U.S. PATENT DOCUMENTS 5,661,544 A * 8/1997 Ishikawa et al. .............. 355/41
6,133,984 A * 10/2000 Deguchi et al. .............. 355/40

FOREIGN PATENT DOCUMENTS

| JP | 2001-142162 | * | 5/2001 |
|----|-------------|---|--------|
| JP | 2004-45954  |   | 2/2004 |
| JP | 2004-045954 | * | 2/2004 |
| JP | 2005-101831 |   | 4/2005 |

* cited by examiner

*Primary Examiner*—Matthew Luu
*Assistant Examiner*—Kendrick X Liu
(74) *Attorney, Agent, or Firm*—Fulbright & Jaworski L.L.P.

(57) ABSTRACT

A printing apparatus in which it is possible to set proper correction data by eliminating an erroneous operation of an operator is constructed. A code indicating the type of used printing paper P is formed on a test chart TC. When the correction data is generated, a printing paper type specifying section 25B of correction data generating means 25 judges whether the printing paper is proper or not based on the code, by setting the test chart TC on a flatbed scanner 5 and performing pre-scan on it. If it is the test chart TC using proper printing paper, then the density data in a plurality of pixel lines constituting the chart is acquired and the correction data is generated by performing the main scan, and the correction data is stored in a correction table 35 in association with the type of the printing paper.

5 Claims, 11 Drawing Sheets

PRINTING APPARATUS

This application claims priority from Japanese Patent Application No. JP 2005-119639 filed Apr. 18, 2005, which is incorporated herein by reference in its entirety.

BACKGROUND OF THE INVENTION

1. Field of the Invention

The present invention relates to a printing apparatus comprising: an exposure head on which a plurality of light amount control sections are arranged in a main scanning direction, wherein a test chart can be created by the relative movement between the exposure head and a photosensitive material in a sub scanning direction that is perpendicular to the main scanning direction and by controlling the light amount control sections of the exposure head based on set exposure data during the relative movement, a scanner for acquiring scanning data by scanning the test chart, and correction data generating means by which correction data for the light amount control sections is generated based on the scanning data and stored in a correction table.

2. Description of the Related Art

As a printing apparatus configured as described above, there are printing apparatuses that create a test print sheet (a test chart of the present invention) from printing paper as a photosensitive material by performing exposure with a fluorescent print head (an exposure head of the present invention), then capture a line image of this test print sheet using a flatbed scanner, and set a correction table based on the density of exposure dot lines that have been captured. The correction table that has been obtained in this manner is used as data for correcting unevenness in the luminance of light-emitting elements arranged on the exposure head.

For example, see JP 2001-142162A (paragraph numbers [0011] to [0031], [0037], and FIGS. 1 to 15).

In this conventional technique, even numbers and odd numbers are given to fluorescent light-emitting elements corresponding to the three primary colors R (red), G (green), and B (blue) constituting the fluorescent print head, and the test print sheet is created by performing exposure on the printing paper by controlling these fluorescent light-emitting elements. On this test print sheet, the configuration is such that a plurality of test exposure dot lines corresponding to the fluorescent light-emitting elements given even numbers or odd numbers are formed, the densities of the center positions in the main scanning direction (width direction of the exposure dot lines) of the exposure dot lines that have been acquired by the flatbed scanner are acquired at a predetermined spacing in the sub scanning direction, and moreover, an average value of the density data contained in check windows is set as a representative density, and correction coefficients of the fluorescent light-emitting elements are generated from the representative density and stored in the correction table.

Describing a photo printing apparatus as an example, when photosensitive materials are manufactured by various manufacturers or when various types of paper are used, various types of sensibility (including color sensitivity) are obtained, and the color develops in various manners. For this reason, it is usual that the correction table described above is set for each of photosensitive materials. Furthermore, it is desirable that the correction table is updated as frequently as possible, and at the time of this update, the correction table is updated for the plurality of photosensitive materials.

Thus, in a conventional process, the processing procedure is such that the type of a photosensitive material is artificially set, a test chart is created using the photosensitive material, the test chart is set at a scanner, and scanning data is acquired. However, in a state where the type of a photosensitive material is set in advance, there is a case in which scanning is erroneously performed on a test chart created on a different type of a photosensitive material, and thus a proper correction table cannot be set. Furthermore, it is difficult for an operator to notice this erroneous operation, and thus an improvement has been required.

SUMMARY OF THE INVENTION

It is an object of the present invention to reasonably construct a printing apparatus in which it is possible to set proper correction data by eliminating an erroneous operation of an operator.

In order to achieve the object, a printing apparatus according to the present invention comprises:

an exposure head on which a plurality of light amount control sections are arranged in a main scanning direction, wherein a test chart can be created by the relative movement between the exposure head and a photosensitive material in a sub scanning direction that is perpendicular to the main scanning direction and by controlling the light amount control sections of the exposure head based on set exposure data during the relative movement, a scanner for acquiring scanning data by scanning the test chart, and correction data generating means by which correction data for the light amount control sections is generated based on the scanning data and stored in a correction table, wherein a code portion indicating a type of the photosensitive material is formed on the test chart, and a table setting routine that is provided in the correction table generating means performs a photosensitive material specifying process for specifying the type of the photosensitive material by extracting the code portion from the scanning data, a density data acquiring process for specifying a plurality of pixel lines corresponding to the plurality of light amount control sections from among the scanning data and acquiring density data for each of the pixel lines, and a correction data storing process for generating the correction data based on the density data that has been acquired in the density data acquiring process and storing the generated correction data in the correction table in association with the type of the photosensitive material that has been specified in the photosensitive material specifying process.

With this configuration, after scanning data has been acquired by scanning a test chart with a scanner, a table setting routine is performed, and thus the type of a photosensitive material is specified by extracting a code portion from the scanning data, a plurality of pixel lines corresponding to light amount control sections are specified from among the scanning data, and density data for each of the pixel lines is acquired. Next, correction data is generated based on the density data, and is stored in a correction table in association with the specified type of the photosensitive material. More specifically, the correction data corresponding to a specific photosensitive material among a plurality of types is stored in the correction table by scanning the specific photosensitive material among the plurality of types with the scanner, and thus it is possible to properly store the correction data in the correction table by avoiding an erroneous process. As a result, the printing apparatus in which it is possible to set proper correction data by eliminating an erroneous operation of an operator is constructed.

Furthermore, it is also possible that for the table setting routine, a processing order is set such that for each of a plurality of types of said photosensitive materials, the photosensitive material specifying process, the density data acquiring process, and the correction data storing process are performed in this order, and a processing form is set such that if the type of the photosensitive material that has been specified in the photosensitive material specifying process is different from the type of the photosensitive material that is set as a processing target in the process, then the process is stopped and a notification is made.

With this configuration, in a case where the type of the photosensitive material that is set as a processing target is different from the type of the photosensitive material that has been specified in the photosensitive material specifying process, such as a case where a process is performed in the order different from the set processing order, then the process is stopped and a notification is made. Thus, it is possible for the operator to notice the erroneous operation and to perform a proper process.

In the present invention, it is also possible that for the table setting routine, a processing order is set such that for each of a plurality of types of said photosensitive materials, the photosensitive material specifying process, the density data acquiring process, and the correction data storing process are performed in this order, and a processing form is set such that if the type of the photosensitive material that has been specified in the photosensitive material specifying process is different from the type of the photosensitive material that is set as a processing target in the process, then the type of the photosensitive material that has been specified in the photosensitive material specifying process is alternatively set as the processing target, and the process is continued.

With this configuration, in a case where the type of the photosensitive material that is set as a processing target is different from the type of the photosensitive material that has been specified in the photosensitive material specifying process, such as a case where a process is performed in the order different from the set processing order, then the type of the photosensitive material that has been specified in the photosensitive material specifying process is alternatively set as the processing target, and the process is continued. Thus, it is also possible to store the correction data in the correction table in association with the type of the photosensitive material that has been specified in the photosensitive material specifying process.

In the present invention, it is also possible that the correction data generating means is configured so as to perform a posture changing process for judging a posture of the test chart during scanning based on the scanning data that has been acquired by the scanner and changing the posture such that the main scanning direction of the test chart included in the scanning data is along the main scanning direction or the sub scanning direction of the scanner.

With this configuration, when the test chart is set at the scanner and the scanning data is acquired, for example, even if the main scanning direction of the scanner does not agree with the main scanning direction of the scanning data, it is possible to easily perform the process relating to acquiring the density data, by making the main scanning direction of the scanner agree with the main scanning direction of the scanning data through the posture changing process.

In the present invention, it is also possible to further comprise a photosensitive material magazine for accommodating, in a rolled state, the photosensitive material having a long length, a magazine sensor for acquiring photosensitive material information from the photosensitive material magazine, and test printing means for creating the test chart on the photosensitive material by performing exposure based on the exposure data, wherein for the test printing means, a processing form is set such that data for performing exposure on the code portion is set based on a detection signal from the magazine sensor.

With this configuration, when the photosensitive material magazine accommodates a predetermined type of a photosensitive material, the test printing means generates the code indicating the type of the photosensitive material on the test chart created using the photosensitive material.

In the present invention, it is also possible that the test printing means creates a plurality of said test charts each having the code portion, by setting a plurality of sheets of photosensitive material having a length shorter than an exposable area in the main scanning direction of the exposure head, at different positions in the main scanning direction of the exposure head, and performing exposure based on the exposure data, and the correction data generating means creates a single test chart by acquiring densities of pixel lines that are formed in exposure performed by the same light amount control section, on overlapping portions in the main scanning direction of the exposure head, from among the scanning data of the plurality of test charts, adjusting the density of the pixel line on at least one test chart so as to make the densities of the pixel lines be in agreement, and after the density has been adjusted, performing combination in such a manner that the plurality of test charts are joined together at the overlapping portions.

With this configuration, with respect to the plurality of photosensitive materials, the correction data can be generated based on the plurality of test charts created by performing exposure based on the exposure data, and can be stored in the correction table, without using a photosensitive material of an exposable width in the main scanning direction of the exposure head. Furthermore, when the plurality of test charts are created, the code portions are respectively formed on the test charts, and thus it is possible to specify the photosensitive materials. Focusing on one or a plurality of pixel lines in the exposure overlapping portion with other photosensitive material in one test chart, the light amount control sections that have formed the pixel lines are specified, and pixel lines (pixel lines that have been formed by the same light amount control sections) that have been formed on the other test chart by these light amount control sections are extracted, and the densities of the pixel lines on at least one test chart are adjusted so as to make the densities of the pixel lines be in agreement. When the densities are thus adjusted, if the densities of the plurality of pixel lines are acquired, it is possible to perform the density adjustment at high precision, for example, by performing a process for obtaining the average value of the densities. Subsequently, a single test chart is created by performing composition in such a manner that the plurality of photosensitive materials are joined together at the overlapping portions, and thus the correction data can be generated from the combined test chart, and can be stored in the correction table.

DESCRIPTION OF THE PREFERRED EMBODIMENT

Hereinafter, embodiments of the present invention will be described with reference to the accompanying drawings.

[Configuration of Photo Printing Apparatus]

Figure 1:
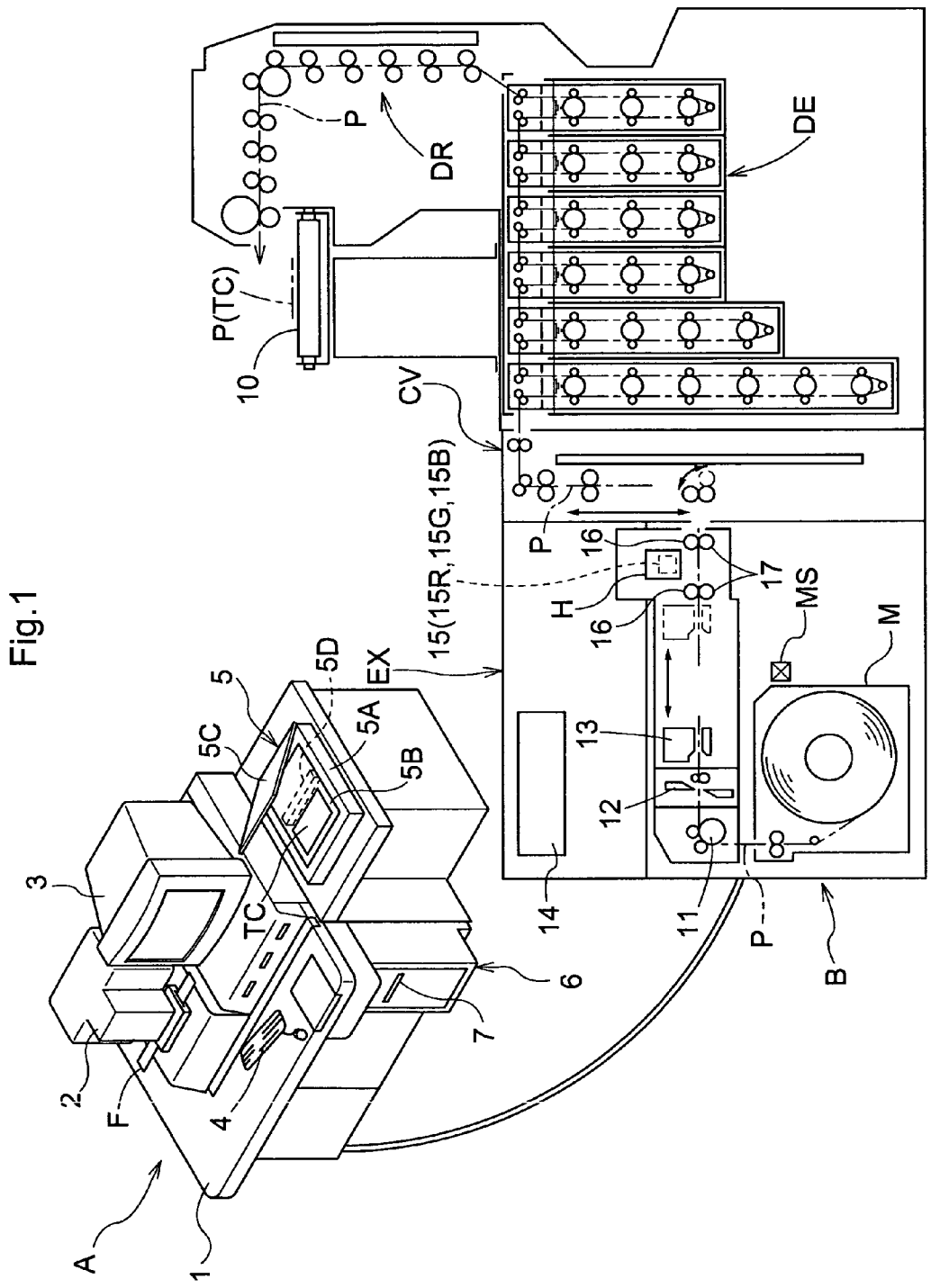
FIG. 1 is a view schematically showing the configuration of a photo printing apparatus.

As shown in FIG. 1, a photo printing apparatus is configured having an operation section A and a print processing section B. The operation section A is provided with, on an upper face of a table 1, a film scanner 2 that digitalizes and captures image information of a photo film F, a display 3 that displays process information, and a keyboard 4, and a flatbed scanner 5 is arranged at a side portion. A processing device 6 constituted by a general purpose computer is provided under the table 1. Furthermore, the processing device 6 is provided with a media drive 7 that acquires image data recorded on a CD-R or a DVD-R or the like, and image data recorded on semiconductor media.

The flatbed scanner 5 has a scanning table 5B that is constituted by a transparent glass panel or resin panel, formed on a main unit 5A, and is provided with an openable platen cover 5C that covers the scanning table 5B, and a scanner section 5D that is capable of parallel movement in the main unit 5A.

The scanner section 5D extends in the main scanning direction, and is provided with a light source and photoelectric transducers such as CCDs. An image of a scanning subject that is set on the scanning table 5B is acquired by the photoelectric transducers by operating the scanner section 5D in a sub scanning direction that is perpendicular to the main scanning direction while the light source of the scanner section 5D is led to emit light. Furthermore, the flatbed scanner 5 has the resolution in which when pixel lines Q (see FIG. 7) that are formed by light emitted by the light-emitting elements 18 in a line form in the sub scanning direction on the printing paper P are divided into five or more areas in the main scanning direction, the densities of these respective areas can be acquired.

[Print Processing Section]

The print processing section B is configured such that exposure of image data is performed after the printing paper P as a photosensitive material is cut to a print size in an exposure section EX, and after the exposure, the printing paper P is carried upward with its front and back reversed in a vertical carrying device CV and sent into a development section DE, then after the printing paper P that has undergone a development process in the development section DE has been dried in a drying section DR, it is sent in a lateral direction onto a carrying belt 10 and sent from the carrying belt 10 into a sorter (not shown).

In the exposure section EX, the printing paper P (an example of a photosensitive material) is sent from a printing paper magazine M (an example of a photosensitive material magazine) by a pressure-contact supply roller 11, cut to a print size by a cutter 12, sent in a horizontal direction by a chuck 13, then sent into an exposure position from the chuck 13, and exposure of the image data is performed by light rays from an exposure head H while the printing paper P is carried in a horizontal sub scanning direction in the exposure position. Furthermore, a control unit 14 is provided inside the exposure section EX.

The exposure head H is provided with a fluorescent light-emitting tube 15 (a general term for three types of fluorescent light-emitting tubes 15R, 15G, and 15B corresponding to the three primary colors) that downwardly emits light rays of the three primary colors R (red), G (green), and B (blue), and is also provided with a pair of exposure carrying rollers 16 on an upper carry side and a lower carry side of the printing paper P than the exposure position, and driven rollers 17 corresponding to the exposure carrying rollers 16.

Figure 2:
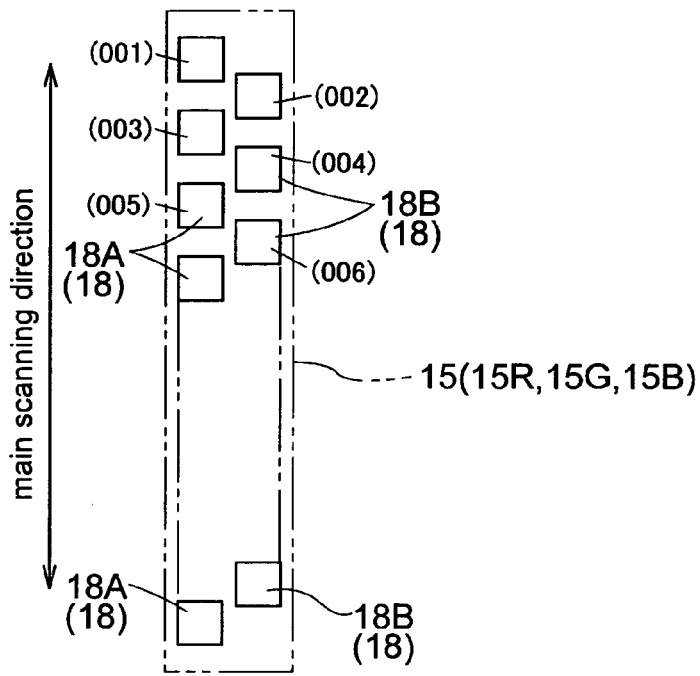
FIG. 2 is a diagram schematically showing the arrangement of light-emitting elements.

The exposure head H is provided with the three types of fluorescent light-emitting tubes 15R, 15G, and 15B corresponding to the three primary colors R (red), G (green), and B (blue), as the exposure head described in Patent Document 1. Each of the fluorescent light-emitting tubes 15R, 15G, and 15B has a structure in which a plurality of light-emitting elements 18 (an example of a light amount control section) are arranged in the main scanning direction in a linear array as shown in FIG. 2 inside a vacuum-state case having a component that permits the transmission of light rays, for example, a transparent glass (not shown).

Incidentally, the three types of fluorescent light-emitting tubes 15R, 15G, and 15B obtain light rays of the three primary colors by letting light rays from the light-emitting elements 18 pass through filters (not shown) corresponding to R (red), G (green), and B (blue), and in these light-emitting elements 18, the luminance of the light-emitting elements 18 can be controlled by regulating the voltage applied to electrodes corresponding to the light-emitting elements 18.

Figure 3:
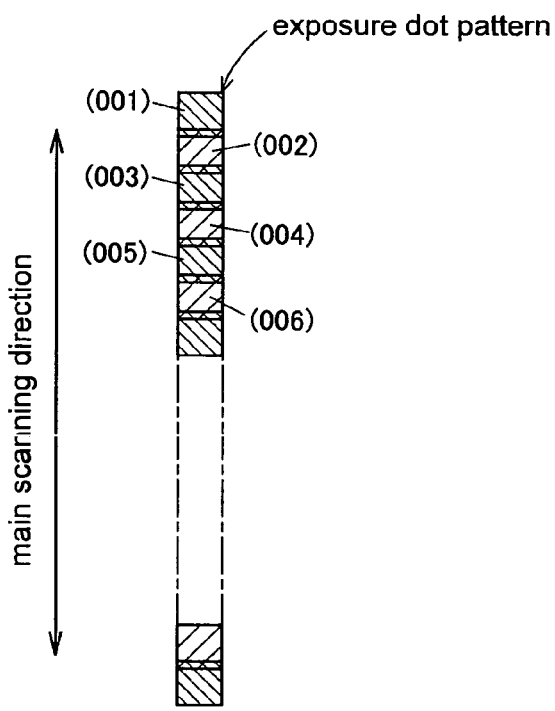
FIG. 3 is a diagram showing an exposure dot pattern.

The plurality of light-emitting elements 18 are arranged in rows having a parallel positional relationship with light-emitting elements 18A given odd numbers and light-emitting elements 18B given even numbers as element numbers. Furthermore, when performing linear exposure in the main scanning direction on the printing paper P by controlling the timing of light emission of the light-emitting elements 18A given odd numbers as element numbers, and the light-emitting elements 18B given even numbers as element numbers, exposure dots (exposure areas (pixels) whose number in parentheses is an odd number) formed by light emitted by the light-emitting elements 18A given odd numbers, and exposure dots (exposure areas (pixels) whose number in parentheses is an even number) formed by light emitted by the light-emitting elements 18B given even numbers are slightly overlapped with each other in the main scanning direction as shown in FIG. 3.

In the present invention, the exposure system may be configured such that as the exposure system described in Patent Document 1, light rays from the three types of fluorescent light-emitting tubes 15R, 15G, and 15B of R (red), G (green), and B (blue) are irradiated onto positions that are different from each other in the sub scanning direction (the same image data is exposed by shifting the timing), and may irradiate the light rays from the three types of fluorescent light-emitting tubes 15R, 15G, and 15B of R (red), G (green), and B (blue) simultaneously onto the same positions by using an optical system such as mirrors.

In particular, in the exposure head H, it is also possible, for example, to replace only the red color elements with light-emitting diodes, or to replace all the elements with light-emitting diodes (an example of light amount control sections). Further still, in the present invention, the exposure head H may be configured such that a plurality of shutters (an example of light amount control sections), for example, of a liquid crystal type are provided along the main scanning direction in the path in which the light rays from the light source are guided to the printing paper P, and the light amount for each pixel is controlled using these shutters.

The vertical carrying device CV is provided with a carrying system in which the printing paper P exposed by the exposure head H is received by the pressure-contact roller and sent into the development section DE by being moved upward in a reversed condition, and the development section DE performs a development process by successively sending the printing paper P that has been sent into a plurality of development baths using rollers including the pressure-contact roller. Furthermore, in the drying section DR, the printing paper P is dried by heat from an infrared heater and a drying airflow from a blower (not shown).

[Control System of Photo Printing Apparatus]

Figure 4:
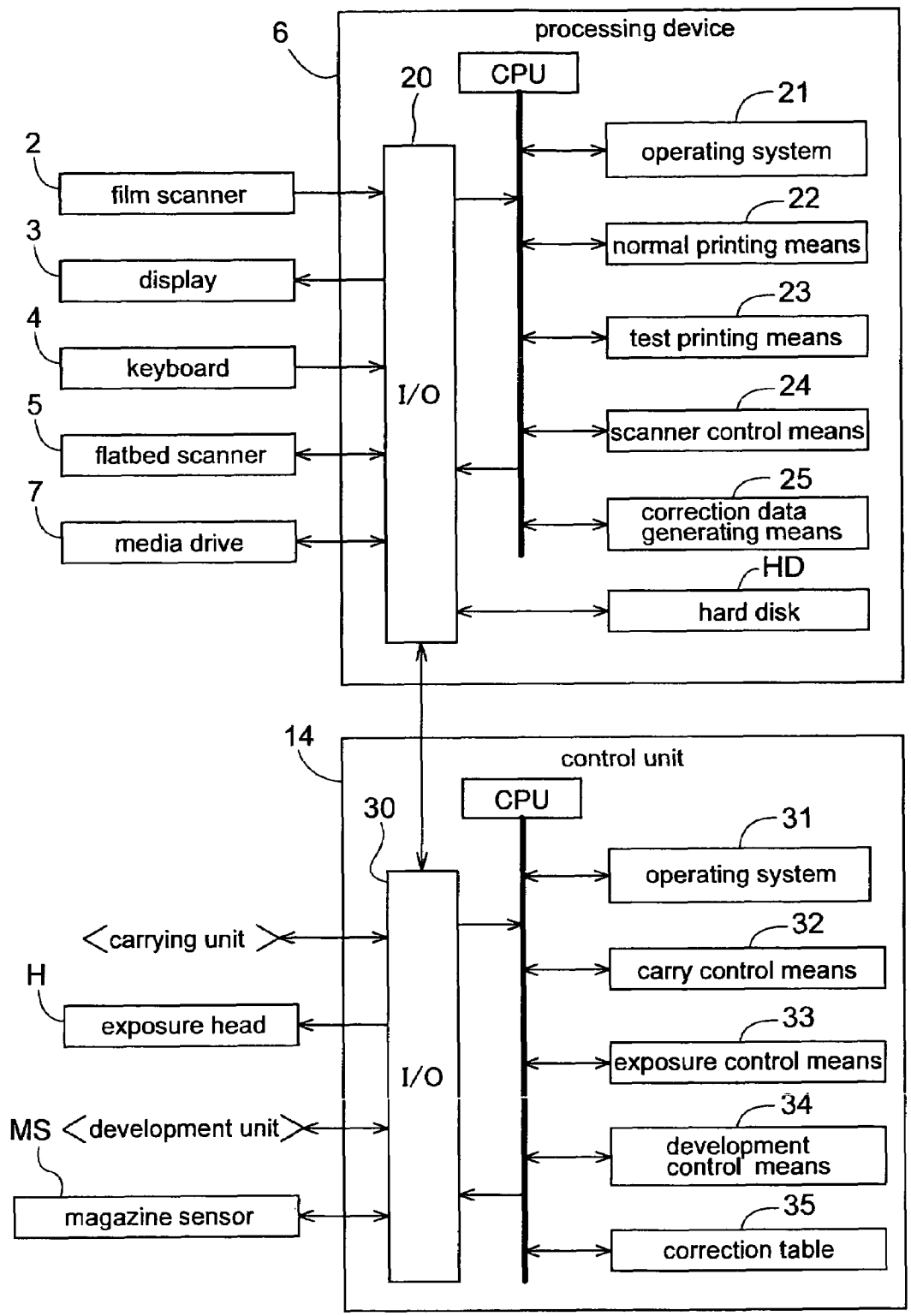
FIG. 4 is a block circuit diagram of a control system.

A control system of the photo printing apparatus can be illustrated as shown in FIG. 4. More specifically, the processing device 6 is provided with a microprocessor (CPU) and an input-output interface 20 that performs input and output of information with respect to the microprocessor (CPU). An input-output system is provided by which information is accessed between the input-output interface 20 and the film scanner 2, the display 3, the keyboard 4, the flatbed scanner 5, the media drive 7, and a hard disk HD respectively. Furthermore, an input-output system is formed by which information is accessed between the data bus of the microprocessor CPU and an operating system 21, normal printing means 22, test printing means 23, scanner control means 24, and correction data generating means 25 respectively.

The operating system 21 displays information necessary to the processing device 6 on the display 3, and functions as an interface that achieves a process in which when information is displayed on the display 3, for example, if a normal printing process is performed in accordance with order information, then the image data as the print target and the order data are acquired and transferred to the normal printing means 22.

The normal printing means 22 achieves a printing process by transmitting image data acquired via the film scanner 2 or the media drive 7, and order information acquired via the keyboard 4 or the like to the print processing section B. Furthermore, the test printing means 23 prints a chart based on the exposure data on the printing paper P by transmitting data from the magazine sensor MS shown in FIG. 1, exposure data for chart creation, and control data to the print processing section B, thereby creating a test chart TC shown in FIG. 6.

By controlling the flatbed scanner 5, the scanner control means 24 achieves a process in which scanning data from a scanning subject (such as the printing paper P) that has been set is acquired and captured by the processing device 6. The correction data generating means 25 performs a process in which correction data is generated from scanning data acquired by scanning the test chart TC using the flatbed scanner 5, this correction data is transmitted to the print processing section B, and a correction table 35 (see FIG. 4) is updated (set). Although not described in detail, the correction table 35 is set for each paper type and a process is performed in which the corresponding correction table 35 is updated based on the paper type determined based on a code portion 40A (see FIG. 6) of the test chart TC.

The control unit 14 is provided with a microprocessor (CPU) and an input-output interface 30 that performs input and output of information with respect to the microprocessor (CPU). An input-output system is provided, with respect to the input-output interface 30, for the carrying unit that carries the printing paper P in the portions of the print processing section B, the exposure head H, the development unit that performs temperature control and liquid level control of the developing liquid in the plurality of development baths in the development section DE, and the magazine sensor MS that specifies the type of printing paper magazine M respectively. Furthermore, an input-output system is formed by which information is accessed between the data bus of the microprocessor CPU and an operating system 31, carry control means 32, an exposure control means 33, development control means 34, and the correction table 35 respectively.

The operating system 31 performs a process for acquiring signals from a sensor system (not shown) and a basic process for outputting control signals to the various control systems, and also achieves processes for the carry control means 32, the exposure control means 33, and the development control means 34 respectively. The carry control means 32 controls the carrying unit to achieve carrying of the printing paper P. The exposure control means 33 controls the exposure head H to achieve a process for exposing image data on the printing paper P. The development control means 34 achieves a process of controlling the liquid temperature and the liquid levels of the developing liquid in the development section DE. The correction table 35 achieves a process for setting the luminance of the light-emitting elements 18 of the fluorescent light-emitting tubes 15R, 15G, and 15B in the exposure head H.

The operating system 21, the normal printing means 22, the test printing means 23, the scanner control means 24, and the correction data generating means 25 in the processing device 6, as well as the operating system 31, the carry control means 32, the exposure control means 33, and the development control means 34 in the control unit 14 are envisaged as software-based developments on semiconductor memories (not shown), but logic-based hardware configurations are also possible and configurations involving combinations with hardware are also possible. In addition to the data bus, for achieving control, the control system also requires such buses as a control bus and an address bus, but the control bus, the address bus, and interface groups are not shown in the drawings in order to avoid complexity.

The photo printing apparatus is configured such that it is possible to precisely correct unevenness in the luminance of the light-emitting elements 18 of the fluorescent light-emitting tubes 15R, 15G, and 15B of the exposure head H based on the correction data of the correction table 35. When performing luminance correction, a test chart TC as shown in FIG. 6 is created by a process in which preset exposure data is exposed on the printing paper P by the test printing means 23, and the correction data generating means 25 generates correction data by scanning the test chart TC with the flatbed scanner 5 and stores (updates) the correction data of the correction table 35.

It should be noted that when creating the test chart TC, the correction data of the correction table 35 that is already set is captured by the exposure control means 33, and thus exposure is performed in such a manner that the exposure data is transmitted to the exposure head H in a state converted by the correction data, and after this exposure, a development process is performed by carrying the printing paper P to the development section DE, then drying the paper in the drying section DR, thereby creating the test chart TC.

[Structure of Test Chart]

Figure 6:
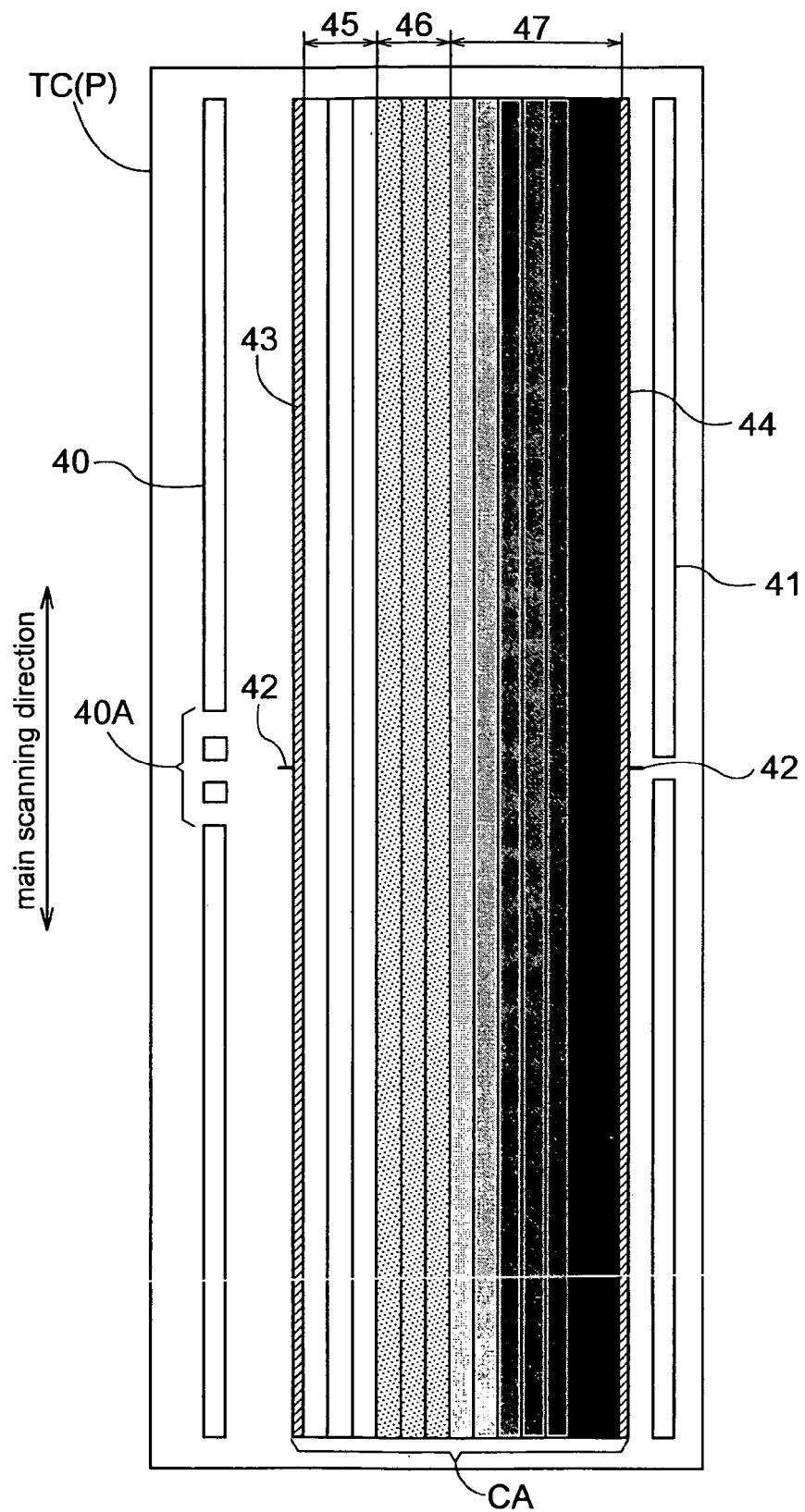
FIG. 6 is a diagram showing a test chart.

As shown in FIG. 6, the test chart TC has the code portion 40A indicating a paper type, and is constituted by a chart area CA formed in an area sandwiched by a start bar 40 that functions as an index indicating a front portion side of the chart, and an end bar 41 indicating an end portion side of the chart. Although the processing form is not described, in the start bar 40, as the code portion 40A indicating the paper type, data corresponding to the type of the printing paper P determined based on information from the magazine sensor MS is selected and printed as image data by the test printing means 23.

Center indexes 42 are formed in the center positions in the main scanning direction of the front portion side and the rear portion side of the chart area CA, and a pixel line portion 43 formed by emitting light from only the light-emitting elements 18A given odd numbers, and a pixel line portion 44 formed by emitting light from only the light-emitting elements 18B given even numbers are formed on the front portion side and the rear portion side of the chart area CA.

Figure 7:
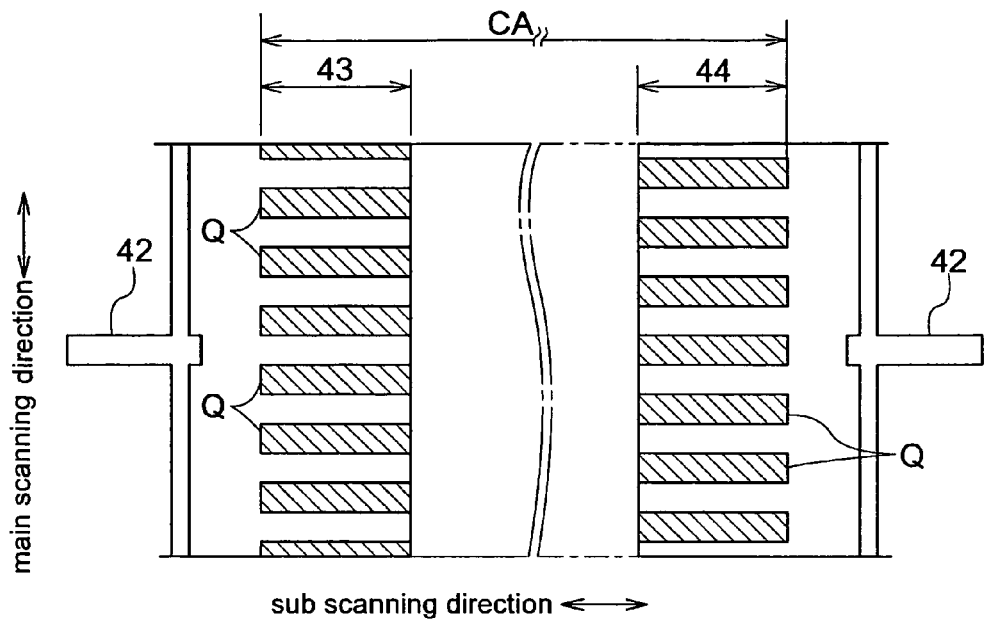
FIG. 7 is an enlarged view showing the structure of the test chart.

An enlarged view of the pixel line portions 43 and 44 can be illustrated as shown in FIG. 7. As shown in FIG. 7, a plurality of pixel lines Q that are formed by light emitted by the light-emitting elements 18A given odd numbers in the pixel line portion 43 are formed in a parallel posture in a comb tooth shape, and a plurality of pixel lines Q that are formed by light emitted by the light-emitting elements 18B given even numbers in the pixel line portion 44 are formed in a parallel posture in a comb tooth shape in the pixel line portions 43 and 44. The width of the pixel lines Q in the main scanning direction is equal to a pixel width.

The chart area CA is constituted by three primary color areas 45, which are formed in hues of yellow (Y), magenta (M), and cyan (C) by independently emitting light from the light-emitting elements 18 of the three types of fluorescent light-emitting tubes 15B, 15G, and 15R of B (blue), G (green), and R (red), irregular color development areas 46 for confirming color development of the printing paper P by performing light emission of a specific color when emitting light of the three primary color areas, and gray color development areas 47, which are developed in a plurality of gradations of gray by letting the light-emitting elements 18 of the three types of fluorescent light-emitting tubes 15B, 15G, and 15R of B (blue), G (green), and R (red) emit light simultaneously at a predetermined light amount. Incidentally, the three primary color areas 45, the irregular color development areas 46, and the gray color development areas 47 correspond to the entire pixel area.

[Control Mode]

This photo printing apparatus is characterized in that when the test charts TC are created using a plurality of types of printing paper P, each of the test charts TC is set at the flatbed scanner 5 and is scanned, it is possible to perform an automated process in which the correction data generating means 25 generates the correction data corresponding to the plurality of types of printing paper P, and stores (updates) the correction data in the correction table 35 in association with the types of printing paper P on which the test charts TC are created.

Furthermore, the scanning data acquired when the test charts TC are set at the flatbed scanner 5 and are scanned is constituted by three types of data corresponding to the three primary colors R (red), G (green), and B (blue). The three types of data are constituted by areas corresponding to the resolution and eight-bit data indicating the density of the areas.

Figure 5:
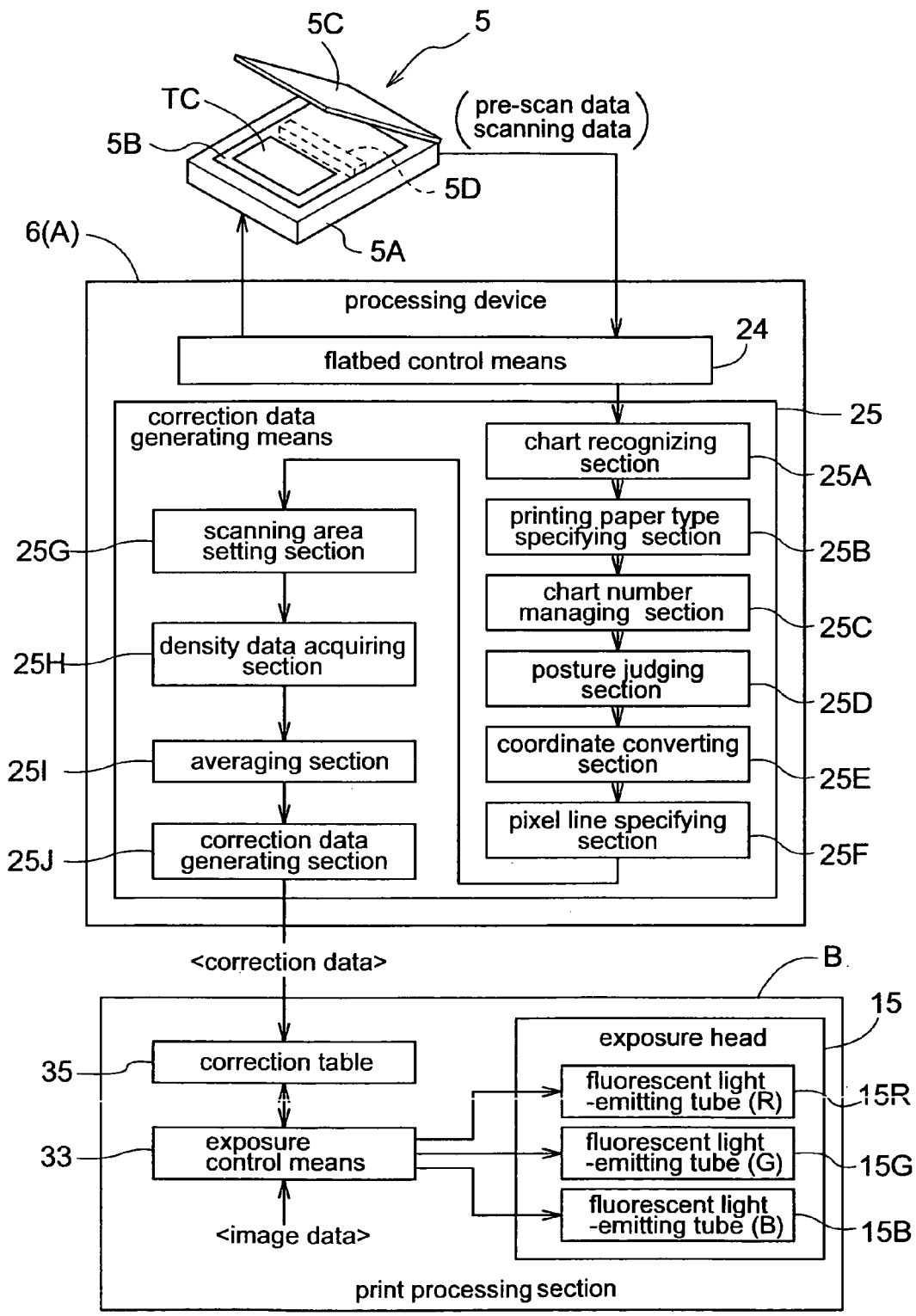
FIG. 5 is a diagram showing the outline of the processing flow.

As shown in FIG. 5, the correction data generating means 25 is provided with a chart recognizing section 25A, a printing paper type specifying section 25B, a chart number managing section 25C, a posture judging section 25D, a coordinate converting section 25E, a pixel line specifying section 25F, a scanning area setting section 25G, a density data acquiring section 25H, an averaging section 25I, and a correction data generating section 25J that are software-based.

Among the plurality of processing sections, the process at the printing paper type specifying section 25B corresponds to a photosensitive material specifying process for specifying the type of the printing paper P (photosensitive material), the processes at the sections from the pixel line specifying section 25F to the correction data generating section 25J correspond to a density data acquiring process for specifying a plurality of pixel lines corresponding to the plurality of light-emitting elements 18 (light amount control sections) from among the scanning data and acquiring the density data for each of the pixel lines, and a correction data storing process in which the correction data is generated based on the density data that has been acquired in the density data acquiring process and stored in the correction table 35 in association with the printing paper P (photosensitive material), and the processes at the posture judging section 25D and the coordinate converting section 25E correspond to a posture changing process.

Figure 11:
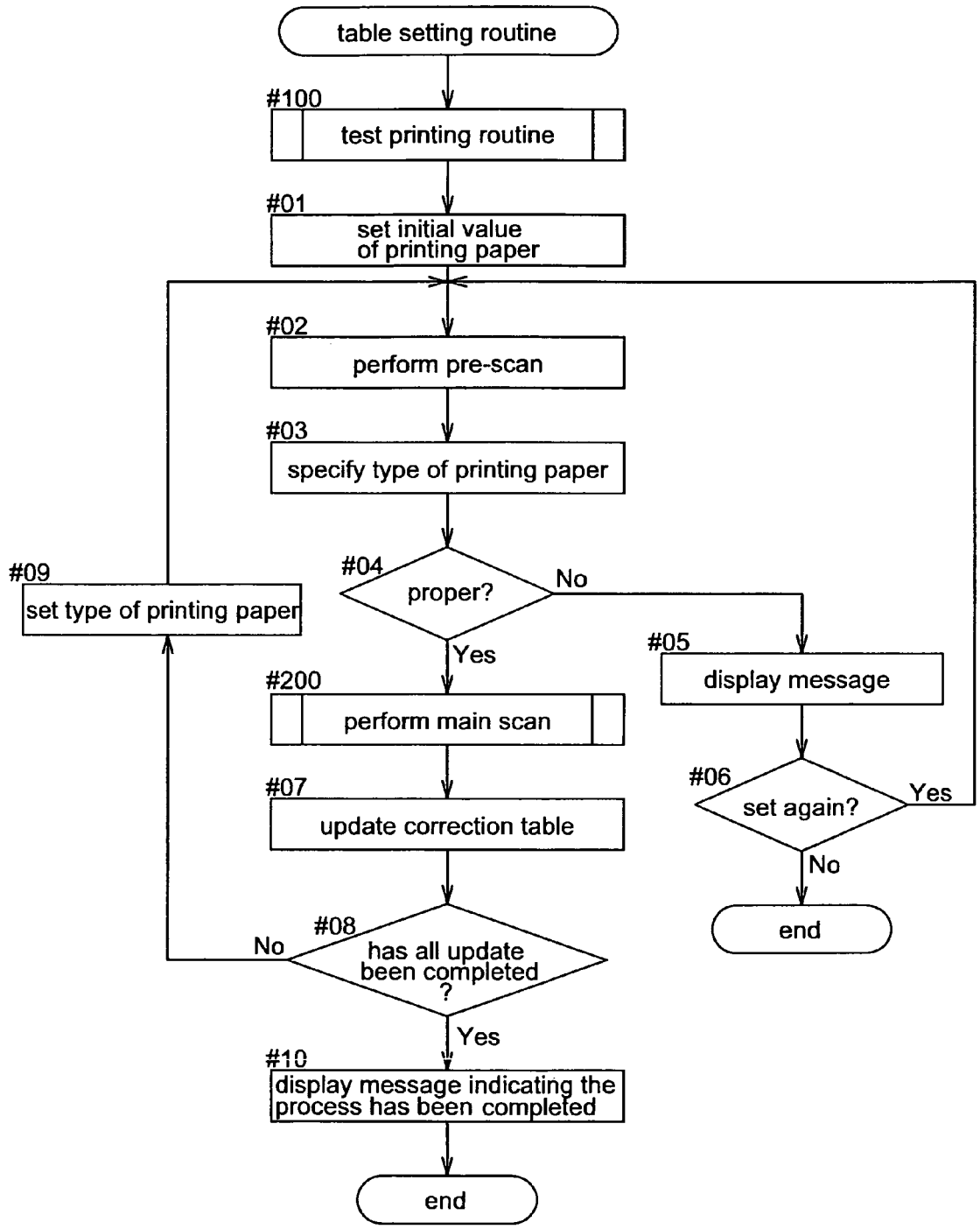
FIG. 11 is a flowchart of a table setting routine.

The series of processes are referred to as "table setting routine", and its processing form can be illustrated as the flowchart in FIG. 11.

[Table Setting Routine]

More specifically, in the processing device 6, when an operator performs an operation of selecting a mode for setting the correction table, the table setting routine is started, and first, a test printing routine (step #100) is performed.

Figure 12:
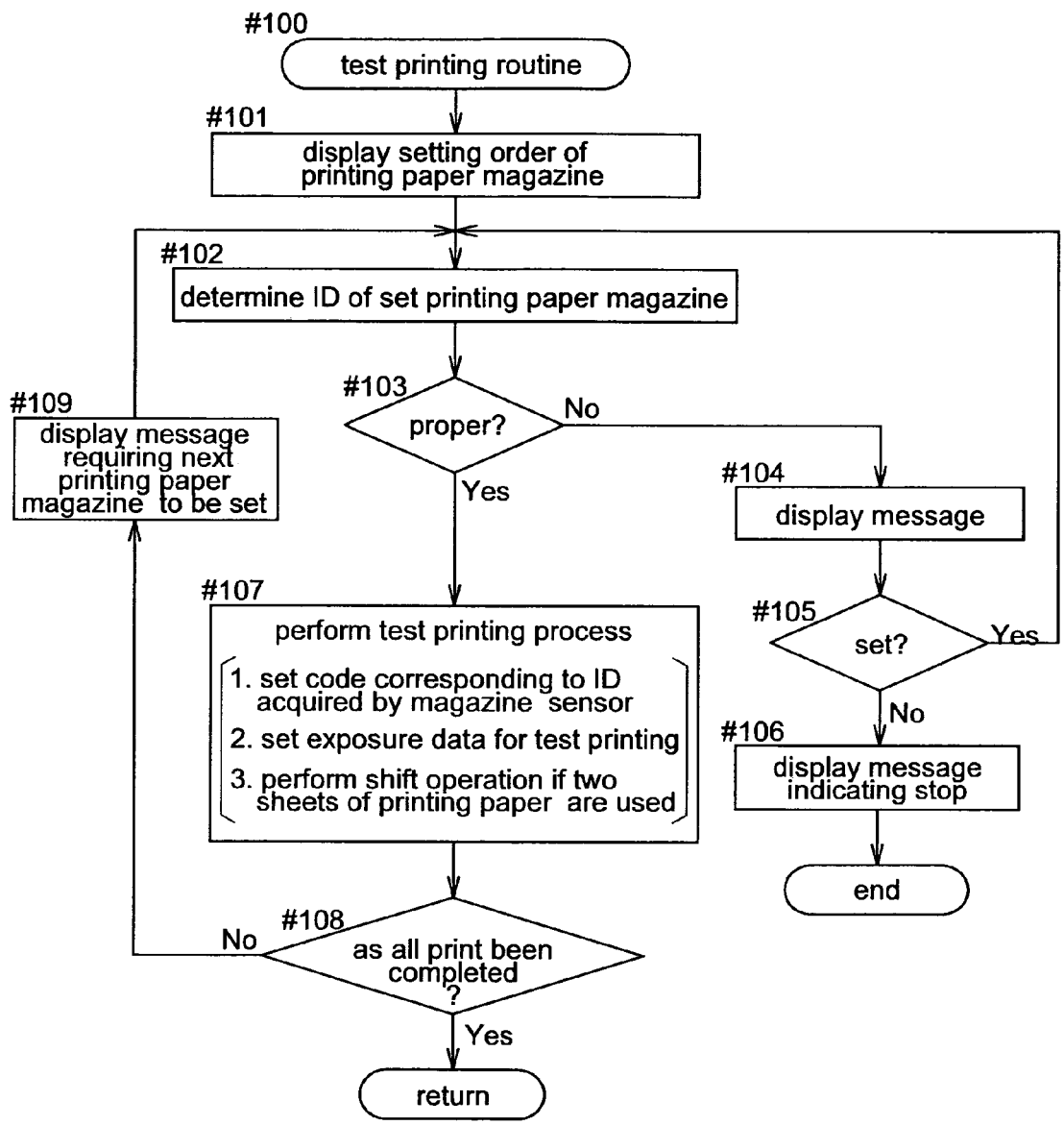
FIG. 12 is a flowchart of a test printing routine.

As shown in the flowchart in FIG. 12, in the test printing routine (step #100), the order in which the printing paper magazine M is to be set at the print processing section B is displayed on the display 3, and the ID of the printing paper magazine M that has been set at the print processing section B is acquired by the magazine sensor MS, and thus the type (the manufacturer's name and the type of the printing paper P) of the printing paper P is specified. If it is determined that the type of the printing paper P is not proper, then the type of the printing paper P that is to be set is displayed on the display 3. When newly set, the ID of the printing paper magazine M is again acquired by the magazine sensor MS, and thus the type of the printing paper P is specified. If the type of the printing paper P is proper, then the procedure proceeds to the next process. If it cannot be confirmed that the proper printing paper magazine M has been set within a predetermined time, then a message indicating that the process is stopped is displayed on the display 3, and the process is ended (steps #101 to #106).

An ID plate (not shown) indicating the type of the accommodated printing paper P is provided on the outer face of the printing paper magazine M, and the magazine sensor MS acquires information of the type of the printing paper P and the width of the printing paper P that is accommodated in the printing paper magazine M, by acquiring ID information from the ID plate.

If it is determined that the proper printing paper magazine M has been set, then the test printing is performed (step #107). In this step, based on the ID information acquired by the magazine sensor MS, a code corresponding to the type of the printing paper P is set, the exposure data for the test printing is set, and if the width of the printing paper P is smaller than the width in the main scanning direction of the exposure head H and it is necessary to create the test chart TC using two sheets of the printing paper P, then the relative positional relationship between the exposure head H and the printing paper P is shifted in the main scanning direction, and the test printing process is performed. The number of sheets of the printing paper P used when the test chart TC is created is not limited to two, and it may be three or more (plural).

More specifically, the image of the test chart TC is as the above-described configuration of the test chart TC, but the data of the code portion 40A of the start bar 40 is changed in accordance with the type of the printing paper P. In other words, the code portion 40A is in the shape of three squares that are independent of each other at the center position in the main scanning direction of the start bar 40, but the number of the squares is changed in accordance with the type of the printing paper P. Furthermore, if there is no stock of the printing paper P with a width that is exposed by light rays from the entire exposable area in the main scanning direction of the exposure head H, then it is possible to create two test charts TC by performing exposure in such a manner that the image of the test charts TC is separated between the two sheets of printing paper P.

Then, the test printing process is performed displaying, on the display 3, a message urging that the proper printing paper magazine M be set, until the test charts TC are completely created using all predetermined types of printing paper P (steps #108 and #109).

The order of the types of the printing paper P used when the types of the printing paper P are set and the test charts TC are printed in this test printing routine is set as the order in which the printing paper P is scanned in the table setting routine, the information is transferred to the correction data generating means 25, and the correction data generating means 25 sets the first type of the printing paper P in the processing order as the initial value of the scanning target (step #01).

In a state where the initial value has been set in this manner, when the test chart TC printed first is set at the flatbed scanner 5 and is scanned, the scanner control means 24 controls the flatbed scanner 5 to perform pre-scan, and transfers the pre-scan data to the correction data generating means 25.

The flatbed scanner 5 that is used has the resolution in which when pixel lines Q that are formed on the test chart TC in the scanning (main scan) are divided into about five areas in the main scanning direction, the density data of each of the areas can be acquired. Pre-scan is a process in which an image of a target set at the flatbed scanner 5 is acquired more roughly than in a main scan, and is effective in that the scanning can be performed in a short time.

Next, the code portion 40A of the start bar 40 is extracted from pre-scan data Dp (see FIG. 9) that has been acquired in pre-scan, and the type of the printing paper P is specified. If the type of the printing paper P is different from the type that is set as the scanning target, then a message indicating that the type of the set printing paper P is not proper and a message indicating the proper type of the printing paper P are displayed on the display 3. When the printing paper P is newly set, pre-scan is again performed. If the proper type of the printing paper P is not set within a predetermined time, then the process is ended (steps #02 to #06).

Figure 13:
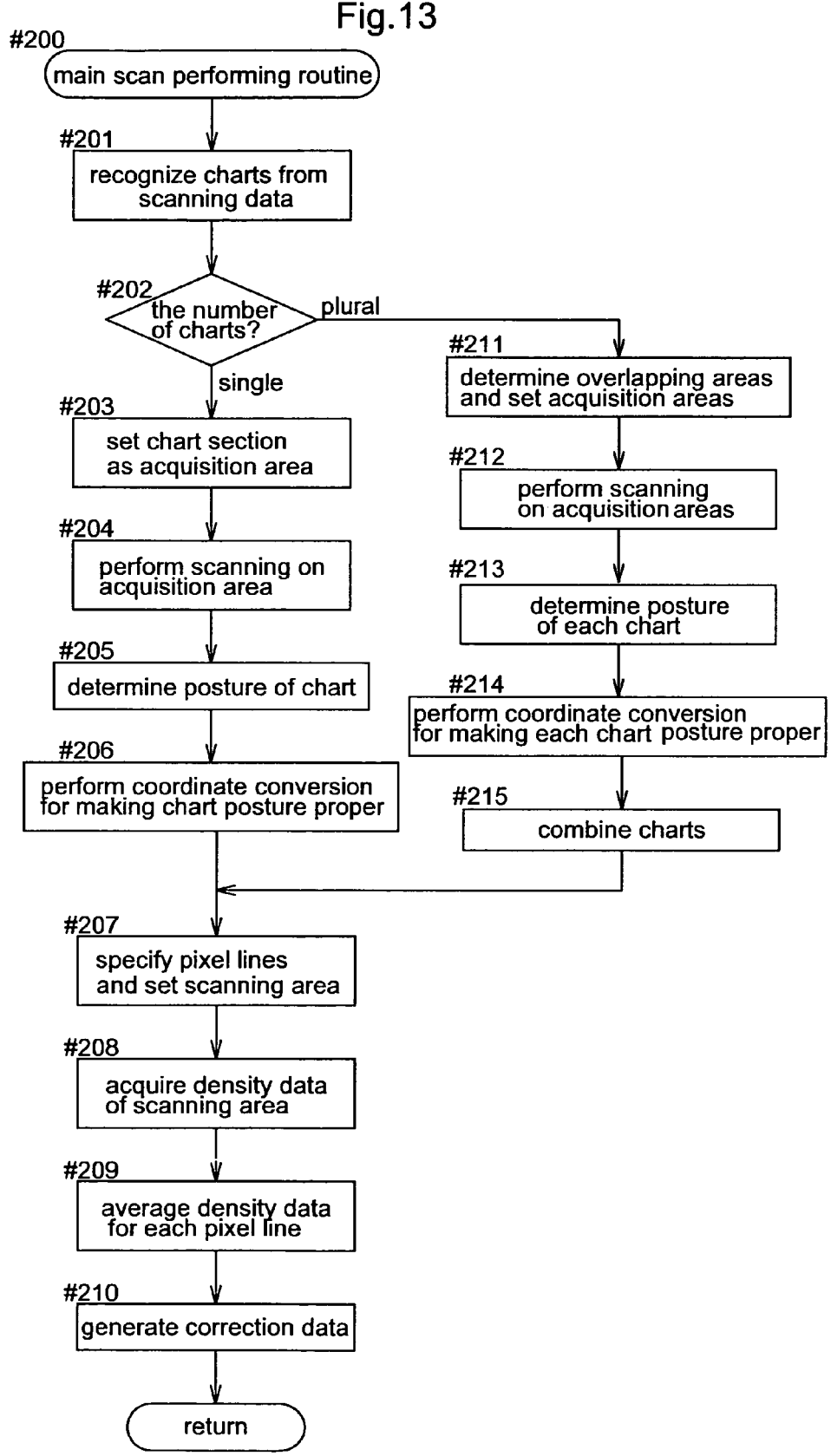
FIG. 13 is a flowchart of a main scan performing routine.

Furthermore, if it is determined that the type of the pre-scanned printing paper P is proper based on the pre-scan data Dp, then the process of a main scan performing routine is performed (step #200). The process of the main scan performing routine can be illustrated as the flowchart in FIG. 13.

More specifically, the charts are recognized from the pre-scan data Dp, and the chart number managing section 25C determines the number of the charts included in the pre-scan data Dp (steps #201 and #202).

In the main scan performing routine, the process that is performed is different between a case in which the test chart TC is created using one sheet of the printing paper P and a case in which the test charts TC are created using two (a plurality of) sheets of printing paper P. Hereinafter, the process on the test chart TC that is created using one sheet of the printing paper P is described first.

Figure 9:
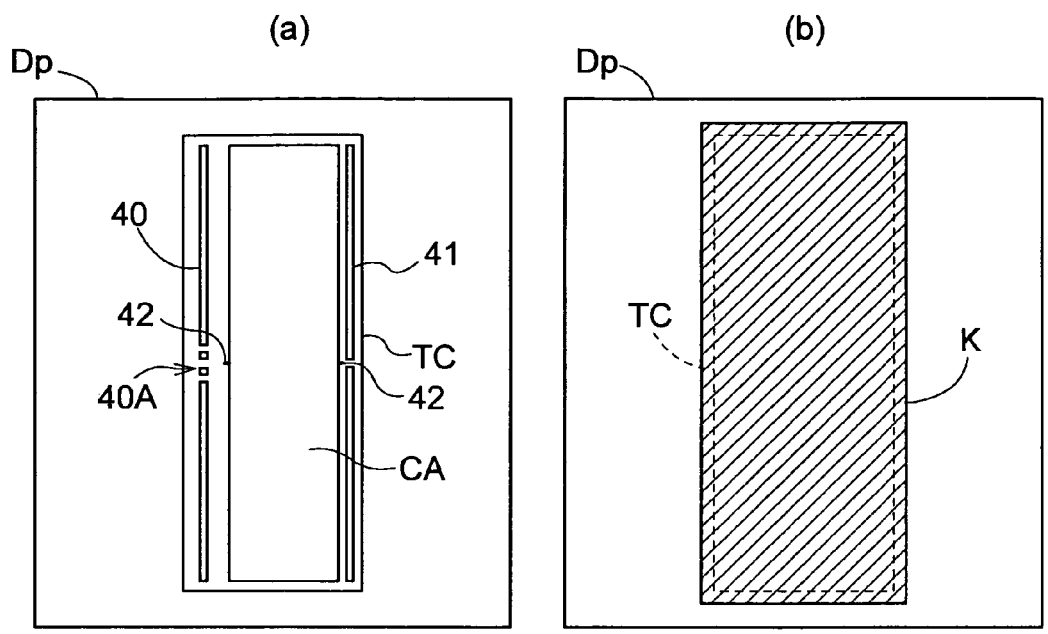
FIG. 9 shows diagrams showing pre-scan data including one test chart.

If the chart number managing section 25C judges that the number of the test charts TC is one, then the chart portion is set as an acquisition area K based on the pre-scan data Dp that has been acquired in the pre-scan, and then the scanning (main scan) at a high resolution is performed (steps #203 and #204). As shown in FIG. 9, the acquisition area K is set in a comparatively small area including the chart (indicated as TC in the drawing) on the test chart TC, so that it is possible to reduce the data amount of the scanning data in the main scan.

Next, the posture judging section 25D determines the posture of the chart (TC) of the scanning data, and the coordinate converting section 25E performs the coordinate converting process for making the posture proper (steps #205 and #206).

It should be noted that the scanning data acquired when the test chart TC is set at the flatbed scanner 5 and the scanning (main scan) in step #204 is performed has the data configuration having the positional data that indicates the positions of pixels with respect to the three primary colors R (red), G (green), and B (blue) and the density data (such as eight-bit data) that corresponds to the positional data. The process described below is performed in a similar manner on all of the three types of density data corresponding to the three primary colors R (red), G (green), and B (blue).

Describing more specifically, the start bar 40 and the end bar 41 are formed in the posture along the main scanning direction of the exposure head H, and thus the pixel lines Q are in the posture extending in the direction parallel to the sub scanning direction. Thus, the process relating to setting sampling areas SA (see FIG. 8; described below) becomes easy by making the direction in which the pixel lines Q extend agree with the main scanning direction or the sub scanning direction of the flatbed scanner 5.

For this reason, the posture judging section 25D determines the posture (inclination angle) taken by at least one of the start bar 40 and the end bar 41, and the main scanning direction (also may be sub scanning direction) of the scanning data. After the posture has been determined, the coordinate converting section 25E performs the coordinate conversion for rotating the scanning data such that, for example, the start bar 40 is made to agree with the main scanning direction of the flatbed scanner 5.

It is not necessary to perform the process by the coordinate converting section 25E in a state where the main scanning direction of the test chart TC agrees with the main scanning direction or the sub scanning direction of the scanning data, and therefore the process by the coordinate converting section 25E is omitted. Furthermore, a processing form of the coordinate converting section 25E may, for example, be set to a processing form such that a sampling coordinate system for specifying the sampling areas SA (described later; in which a vertical direction and a lateral direction of the coordinate system in an initial state agree with the main scanning direction and the sub scanning direction of the exposure head H) is generated, and by rotating the posture of the sampling coordinate system by an angle corresponding to the posture (inclination angle) without rotating the scanning data, the before-rotation and after-rotation coordinate conversion parameters are set. By using these conversion parameters, scanning data of a proper posture may be generated by simulation.

Figure 8:
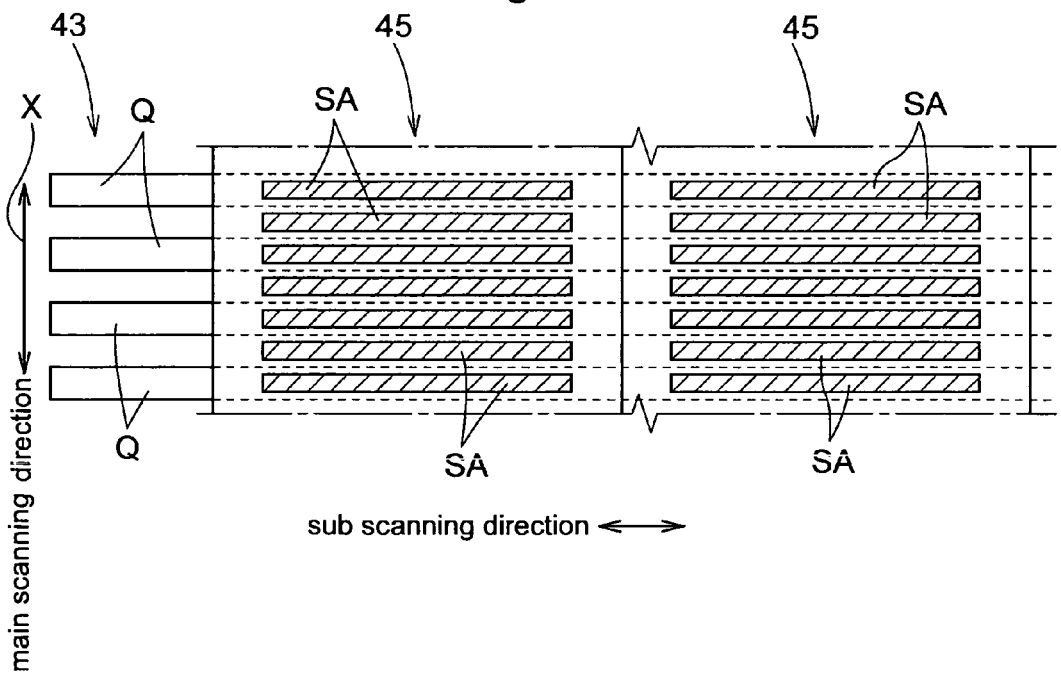
FIG. 8 is a diagram showing sampling areas.

Next, as shown in FIGS. 7 and 8, the pixel line specifying section 25F extracts the positions of the pixel lines Q in the pixel line portions 43 and 44, and determines the correspondence between the plurality of pixel lines Q and the light-emitting elements 18 (18A and 18B) based on the relative positional relationship with respect to the center indexes 42. The scanning area setting section 25G sets, as the sampling areas SA, the positions that are set in the main scanning direction (X-direction in FIG. 8) of the pixel lines Q at the center positions in the main scanning direction of the pixel lines Q (step #207).

More specifically, when the positions of the pixel lines Q are specified, the density data is sampled in the main scanning direction of the pixel line portions 43 and 44 on the test chart TC, areas in which the density is high are specified as the pixel lines Q, and the pixel lines Q are given element numbers of the corresponding light-emitting elements 18 (18A and 18B) based on the relative positional relationship in the main scanning direction between each of the specified pixel lines Q and the center indexes 42. The sampling areas SA are set at portions in the areas of the three primary color areas 45, the irregular color development areas 46, and the gray color development areas 47 that are on the extension lines of the pixel lines Q, at the center areas in the main scanning direction of the pixel lines Q.

The size in the main scanning direction and the size in the sub scanning direction of the thus set sampling areas SA are sufficiently larger than the minimum area that can be acquired by the flatbed scanner 5. Thus, when the densities of the sampling areas SA are acquired, a plurality of (about 400) sampling points are set in the sampling areas SA, and the density data at each of the sampling points is acquired.

Next, the density data acquiring section 25H acquires the density data at the sampling points in the sampling areas SA, the averaging section 25I averages the plurality of sets of acquired density data for each pixel line, and the correction data is generated by giving the element number to the average value in order to eliminate unevenness in the light amount of the light-emitting elements 18 (steps #208 to #210).

Figure 10:
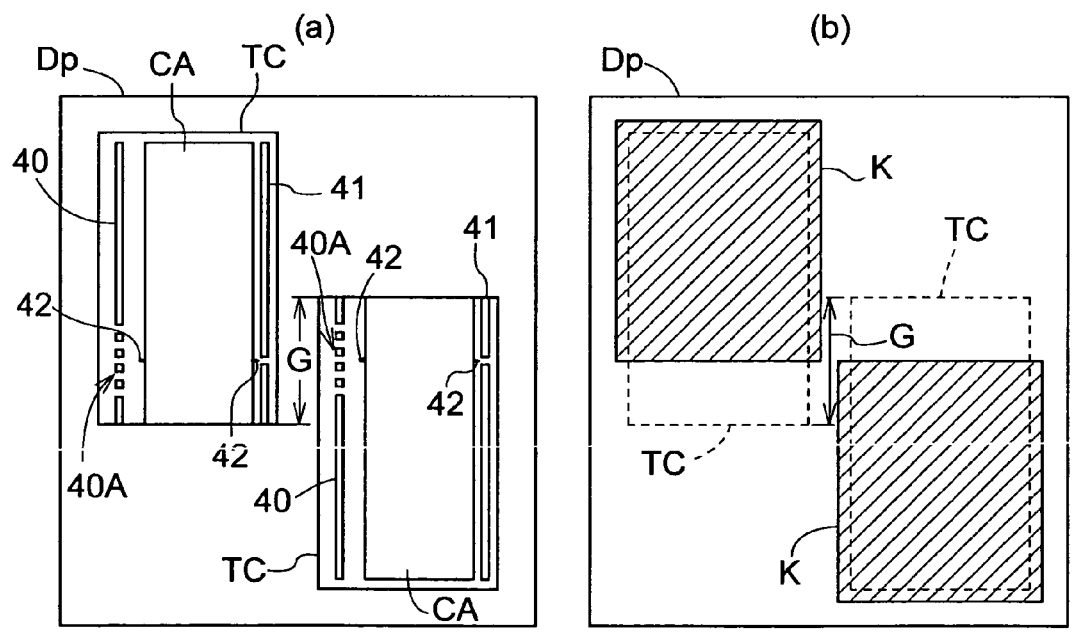
FIG. 10 shows diagrams showing pre-scan data including two test charts.

Furthermore, in a case where the process is performed based on two test charts TC in step #202, as shown in FIG. 10, overlapping areas G in the two test chart (TC) are determined based on the pre-scan data Dp that has been acquired in the pre-scan, and the acquisition areas K are set such that the scanning amount becomes minimum, and then the scanning (main scan) at a high resolution is performed at each of the acquisition areas K (steps #211 and #212).

Next, the posture judging section 25D determines the posture of the scanning data, the coordinate converting section 25E performs the coordinate converting process for making the posture proper, and the process for combining the two charts is performed (steps #213 to #215).

Describing more specifically, two test charts TC are created using two sheets of the printing paper P in the test printing routine, and the pre-scan data Dp obtained when the two test charts TC are pre-scanned have the configuration in which the center portions in the main scanning direction of the charts are overlapped with each other at the overlapping areas G as shown in FIG. 10.

Since each of the two charts includes the center indexes 42, in the overlapping areas G, it is possible to specify the element number of the pixel lines Q that are included in the areas based on the center indexes 42. Using this feature, in one test chart TC, the area including the pixel lines Q up to the pixel line Q at the end portion on the longer side, with respect to the center indexes 42, in the main scanning direction of the exposure head H is set as the acquisition area K, and in the other test chart TC, the area including the pixel lines Q from the pixel line Q including the center indexes 42 to the pixel line Q at the end portion on the longer side (side opposite to the longer side in the one test chart TC) in the main scanning direction of the exposure head H is set as the acquisition area K.

After the acquisition areas K are set in this manner, then the scanning data is acquired by performing the scanning (main scan) at a high resolution at each of the areas. When this scanning is performed, it is assumed that the scanner section 5D of the flatbed scanner 5 is operated twice, but it is also possible that a processing form is set such that two sets of scanning data are acquired in a single operation.

Next, a process is performed in which the pixel lines Q having the same element number in the overlapping areas G are specified from among the two sets of scanning data, and the densities of the pixel lines Q having the same element number are compared with each other, and the density of the pixel line Q on one test chart is shifted such that the densities are in agreement. When the densities of the pixel lines Q having the same element number are compared with each other in this manner, it is possible to perform the process at high precision, by selecting the plurality of pixel lines Q from one test chart, acquiring the densities of the pixel lines Q having the same element numbers as those of the plurality of selected pixel lines Q in the other test chart, setting the density value by obtaining the average value, and then shifting the density of either one test chart.

Next, through the composition process, the scanning data serving as a single chart is created in such a manner that the areas set in the two sets of scanning data are joined together. It should be noted that the areas set in the two sets of scanning data refer to, as described above, the area including the pixel lines Q up to the pixel line Q at the end portion on the longer side, with respect to the center indexes 42, in the main scanning direction of the exposure head H in one test chart TC, and the area including the pixel lines Q from the pixel line Q including the center indexes 42 to the pixel line Q at the end portion on the longer side (side opposite to the longer side in the one test chart TC) in the main scanning direction of the exposure head H in the other test chart TC.

After the process of the main scan process (step #200), a process in which the correction data is given information based on which the type of the printing paper P can be specified, and is stored (updated) in the correction table 35 is performed (step #07). After the process in which the correction data corresponding to the type of the printing paper P is stored (updated) in the correction table 35 based on the scanning data obtained by the flatbed scanner 5 has been performed on all predetermined types of printing paper P, a message indicating that the process has been completed is displayed on the display 3, and the process is ended (steps #08 to #10).

In this process, the type and the order of the printing paper P used for creating the test chart TC are predetermined, the test chart TC is created by performing the test printing in the set order using the type of the printing paper P set as the first. Next, when the created test chart TC is set at the flatbed scanner 5, first, the type of the printing paper P is specified through the pre-scan based on the structure of the code portion 40A of the start bar 40 that is formed on the test chart TC. If the type of the printing paper P is proper referring to the predetermined order, then the process is performed in which the pixel lines Q corresponding to the light-emitting elements 18 are specified and the correction data is generated by performing the main scan, and the correction data is stored (updated) in the correction table 35 while giving information indicating the type of the printing paper P (in association with the type of the printing paper P), and thus the correction data can be generated and stored in the correction table 35 in such a manner that the main portion in the process is automatically performed.

In particular, if the test chart TC is set at the flatbed scanner 5 in the wrong order that is different from the predetermined order in this process, the operator is urged to perform a proper operation by displaying on the display 3 a message indicating that an erroneous operation has been performed and by temporarily stopping the process, and thus the trouble that erroneous correction data is stored is avoided.

Furthermore, when the test charts TC are created using the two sheets of printing paper P, through the pre-scan described above, it is determined that two test charts TC of a small size are used, and a single scanning data is generated from the two test charts TC by combining two sets of scanning data that have been acquired in the main scan, so that it is possible to store the correction data in a process as in the case in which one test chart TC is used.

[Embodiment with Different Table Setting Routine]

Figure 14:
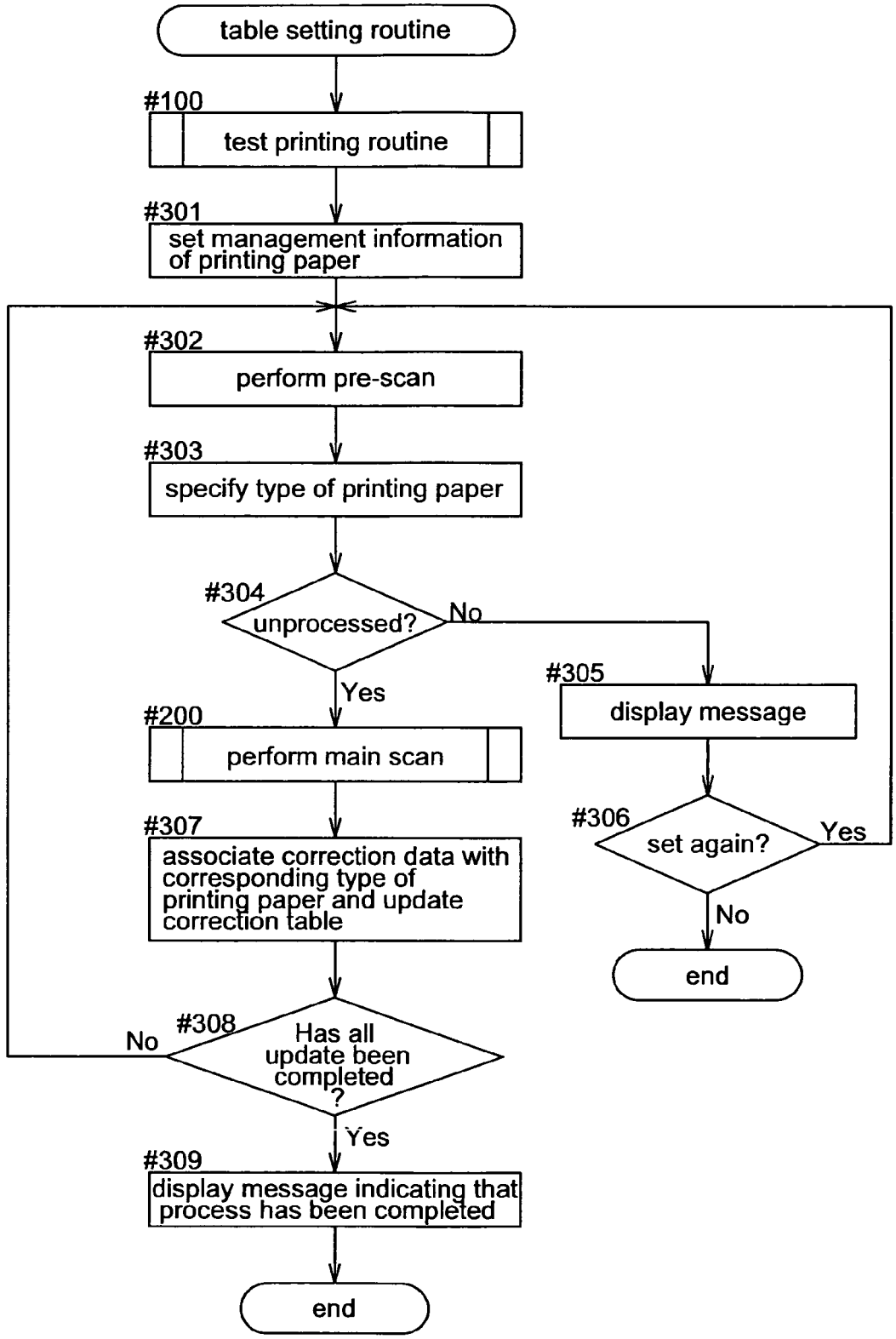
FIG. 14 is a flowchart of an embodiment in which a different test printing routine is applied.

As shown in the flowchart in FIG. 14, the processes in step #100 and step #200 are the same as those described in the foregoing embodiment, but this routine is characterized in that a processing form is set such that the scanning order of the test charts TC is not set, and the correction data is generated and stored in the correction table 35 in the order in which the scanning has been performed.

More specifically, after the test printing routine (step #100), the type of the printing paper P having the test chart TC that has been created in the test printing routine is transferred to the correction data generating means 25, and is set as management information (step #301). Next, the test chart TC is set at the flatbed scanner 5 and is pre-scanned, the type of the printing paper P is specified based on the code portion 40A of the start bar 40, it is judged whether or not scanning of the printing paper P having the test chart TC has been unprocessed, and only if it has not been unprocessed (if it has been already processed), then a process for urging that the test chart TC be set again is performed (steps #302 to #306). Furthermore, if it has been unprocessed, then a process is performed in which the correction data is acquired by performing the main scan, and the correction data is stored (updated) in the correction table 35 in association with the corresponding type of the printing paper P (steps #200 and #307).

After this process has been performed on all types of printing paper P that have been set at the management information, a message indicating that the process has been completed is displayed on the display 3, and the process is ended (steps #308 and #309).

In this process, when the test chart TC is set at the flatbed scanner 5, first, the type of the printing paper P is specified through the pre-scan based on the structure of the code portion 40A of the start bar 40 that is formed on the test chart TC. As long as the correction data has been already generated for this type of the printing paper P, the process is performed in which the pixel lines Q corresponding to the light-emitting elements 18 are specified and the correction data is generated by performing the main scan, and the correction data is stored (updated) in the correction table 35 while giving information indicating the type of the printing paper P (in association with the type of the printing paper P), and thus the correction data can be generated and stored in the correction table in such a manner that the main portion in the process is automatically performed, even without taking, into consideration, the order in which the test charts TC are set at the flatbed scanner 5.

As described above, in the present invention, when the correction data corresponding to a plurality of types of printing paper P is stored in the correction table, even in a case where a necessary test chart TC is created in an automated process, and then the correction data is generated from the test chart TC, it is possible to store proper correction data in the correction table 35 while avoiding storing erroneous correction data caused by an erroneous operation of the operator. In particular, in the present invention, the pre-scan is performed first, and the acquisition area K having a size substantially the same as that of the test chart TC is set based on the pre-scan data Dp that has been acquired in the pre-scan, and then the main scan is performed on the acquisition area K. Thus, compared with a case in which the scanning is performed on a large face, it is possible to shorten the time necessary for the scanning and to reduce the processing data. Furthermore, when the test chart TC is created, even if there is no stock of the printing paper P with a width that is exposed by light rays from the entire exposable area in the main scanning direction of the exposure head H, proper correction data can be generated from the test chart TC that has been created using the printing paper P of a small size, and can be stored in the correction table 35.

[Other Embodiments]

In addition to the foregoing embodiment, the present invention may also be configured as follows.

(1) A structure in which an exposure head of the printing apparatus moves on a photosensitive surface side of a fixed photosensitive material may be applied. In the printing apparatus provided with this exposure head, the exposure head is provided with light amount control sections such as light-emitting diodes in the main scanning direction, and an operation is performed in which this exposure head is led to move in the sub scanning direction.

(2) The configuration of the scanner may be such that a scanning section for acquiring images is fixed, and the printing paper P is sent into the scanning section. Furthermore, it is also possible to use a scanner having the resolution in which it is possible to acquire the density data when pixel lines of the test chart are divided into six or more areas in the main scanning direction. When using the scanner with this resolution, it is possible to generate the correction data better.

(3) When the test chart TC is scanned by the flatbed scanner, it is also possible to set a processing form such that the scanning data is acquired in a single scanning without performing the pre-scan.

The present invention is also applicable to a printing apparatus that is provided with a special-purpose scanner for performing scanning on the test charts and a printing apparatus that performs a development process on a photosensitive material without using a developing liquid.

What is claimed is:

1. A printing apparatus comprising:
an exposure head on which a plurality of light amount control sections are arranged in a main scanning direction, wherein a test chart is created by the relative movement between the exposure head and a photosensitive material in a sub scanning direction that is perpendicular to the main scanning direction and by controlling the light amount control sections of the exposure head based on set exposure data during the relative movement,
a scanner for acquiring scanning data by scanning the test chart, correction data generating means by which correction data for the light amount control sections is generated based on the scanning data and stored in a correction table, and test printing means for creating the test chart on the photosensitive material by performing exposure based on the exposure data, wherein a code portion indicating a type of the photosensitive material is formed on the test chart, and a table setting routine that is provided in the correction data generating means performs a photosensitive material specifying process for specifying the type of the photosensitive material by extracting the code portion from the scanning data, a density data acquiring process for specifying a plurality of pixel lines corresponding to the plurality of light amount control sections from among the scanning data and acquiring density data for each of the pixel lines, and a correction data storing process for generating the correction data based on the density data that has been acquired in the density data acquiring process and storing the generated correction data in the correction table in association with the type of the photosensitive material that has been specified in the photosensitive material specifying process; and wherein the test printing means creates a plurality of said test charts each having the code portion, by setting a plurality of sheets of the photosensitive material having a width shorter than an exposable area in the main scanning direction of the exposure head, at different positions in the main scanning direction of the exposure head, and performing exposure based on the exposure data, and the correction data generating means creates a single test chart by acquiring densities of pixel lines that are formed in exposure performed by the same light amount control section, on overlapping portions in the main scanning direction of the exposure head, from among the scanning data of the plurality of test charts, then adjusting the density of one of said pixel lines on at least one test chart so as to make the densities of the pixel lines be in agreement, and, after the density has been adjusted, performing a combination in such a manner that the plurality of test charts are joined together at the overlapping portions.

2. The printing apparatus according to claim 1, further comprising:

a photosensitive material magazine for accommodating, in a rolled state, the photosensitive material having a long length, and a magazine sensor for acquiring photosensitive material information from the photosensitive material magazine, wherein for the test printing means, a processing form is set such that data for performing exposure on the code portion is set based on a detection signal from the magazine sensor.

3. The printing apparatus according to claim 1, wherein for the table setting routine, a processing order is set such that for each of a plurality of types of the photosensitive material, the photosensitive material specifying process, the density data acquiring process, and the correction data storing process are performed in this order, and a processing form is set such that if the type of the photosensitive material that has been specified in the photosensitive material specifying process is different from the type of the photosensitive material that is set as a processing target in the process, then the process is stopped and a notification is made.

4. The printing apparatus according to claim 1, wherein for the table setting routine, a processing order is set such that for each of a plurality of types of said photosensitive materials, the photosensitive material specifying process, the density data acquiring process, and the correction data storing process are performed in this order, and a processing form is set such that if the type of the photosensitive material that has been specified in the photosensitive material specifying process is different from the type of the photosensitive material that is set as a processing target in the process, then the type of the photosensitive material that has been specified in the photosensitive material specifying process is alternatively set as the processing target, and the process is continued.

5. The printing apparatus according to claim 1, wherein the correction data generating means is configured so as to perform a posture changing process for judging a posture of the test chart during scanning based on the scanning data that has been acquired by the scanner and changing the posture such that the main scanning direction of the test chart included in the scanning data is along the main scanning direction or the sub scanning direction of the scanner.

* * * * *